US010424116B2

(12) United States Patent
Kim

(10) Patent No.: US 10,424,116 B2
(45) Date of Patent: Sep. 24, 2019

(54) DISPLAY APPARATUS AND CONTROLLING METHOD THEREOF

(71) Applicant: SAMSUNG ELECTRONICS CO., LTD., Suwon-si (KR)

(72) Inventor: Byoung-hyun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 27 days.

(21) Appl. No.: 15/193,506

(22) Filed: Jun. 27, 2016

(65) Prior Publication Data
US 2017/0053448 A1    Feb. 23, 2017

(30) Foreign Application Priority Data
Aug. 19, 2015    (KR) .................. 10-2015-0116597

(51) Int. Cl.
| | |
|---|---|
| *G06T 19/00* | (2011.01) |
| *G09G 5/37* | (2006.01) |
| *G06F 3/01* | (2006.01) |
| *G06K 9/00* | (2006.01) |
| *G06Q 30/06* | (2012.01) |
| *G06F 3/03* | (2006.01) |
| *G06K 9/32* | (2006.01) |
| *G06F 3/042* | (2006.01) |

(52) U.S. Cl.
CPC ............ *G06T 19/006* (2013.01); *G06F 3/013* (2013.01); *G06F 3/017* (2013.01); *G06F 3/0304* (2013.01); *G06K 9/00355* (2013.01); *G06K 9/00597* (2013.01); *G06K 9/00671* (2013.01); *G06K 9/00771* (2013.01); *G06K 9/3233* (2013.01); *G06Q 30/0623* (2013.01); *G09G 5/37* (2013.01); *A63F 2300/1087* (2013.01); *G06F 3/0425* (2013.01)

(58) Field of Classification Search
CPC .... G08G 5/0008; G08G 5/0013; H04L 67/02; G06Q 20/102; G06Q 10/087; G06Q 30/0205; G06Q 30/0631; G06Q 30/0241; G06F 3/013; G06F 1/163; H04N 13/296; H04N 5/2256; G06K 9/3233; G06K 9/00671; G06K 9/00771; G06T 19/006
USPC ...................................................... 345/633
See application file for complete search history.

(56) References Cited

U.S. PATENT DOCUMENTS

| | | | |
|---|---|---|---|
| 7,328,119 B1 | 2/2008 | Pryor et al. | |
| 2002/0036617 A1 | 3/2002 | Pryor | |
| 2002/0064764 A1* | 5/2002 | Fishman ............ | A63B 24/0003 434/252 |

(Continued)

OTHER PUBLICATIONS

Communication dated Sep. 1, 2016, issued by the European Patent Office in counterpart European application No. 16171783.0.

*Primary Examiner* — Ryan R Yang
(74) *Attorney, Agent, or Firm* — Sughrue Mion, PLLC

(57) ABSTRACT

A display apparatus includes a display, an image capturer configured to produce a captured image by capturing an image of a user, a controller configured to analyze a user's movement in the captured image and to extract at least one area of interest in the captured image based on the analyzed movement, and a memory configured to store at least one area of interest from the captured image, wherein the controller, in response to the predetermined event occurring, controls the display to display at least one area of interest.

14 Claims, 10 Drawing Sheets

(56) References Cited

U.S. PATENT DOCUMENTS

| | | | |
|---|---|---|---|
| 2003/0048926 A1* | 3/2003 | Watanabe | G06K 9/00362 382/103 |
| 2008/0239139 A1* | 10/2008 | Choi | H04N 5/23212 348/345 |
| 2011/0123079 A1* | 5/2011 | Gustafson | G06F 19/321 382/131 |
| 2012/0062736 A1* | 3/2012 | Xiong | G06F 3/017 348/143 |
| 2013/0254066 A1 | 9/2013 | Amacker et al. | |
| 2014/0168056 A1* | 6/2014 | Swaminathan | G06K 9/00604 345/156 |
| 2014/0198129 A1* | 7/2014 | Liu | G06F 3/04815 345/633 |
| 2014/0226000 A1* | 8/2014 | Vilcovsky | G06F 3/017 348/77 |
| 2015/0009334 A1* | 1/2015 | Kwon | H04N 5/23293 348/164 |
| 2015/0324645 A1* | 11/2015 | Jang | G06F 3/012 345/633 |
| 2016/0240002 A1* | 8/2016 | Ogata | G06T 19/00 |

\* cited by examiner

DISPLAY APPARATUS AND CONTROLLING METHOD THEREOF

CROSS-REFERENCE TO RELATED APPLICATION(S)

This application claims priority from Korean Patent Application No. 10-2015-0116597, filed on Aug. 19, 2015 in the Korean Intellectual Property Office, the disclosure of which is incorporated herein by reference in its entirety.

BACKGROUND

1. Field

Apparatuses and methods consistent with exemplary embodiments relate to a display apparatus and a controlling method thereof, and more particularly, to a display apparatus capable of providing information about an area of interest from an image and a controlling method thereof.

2. Description of the Related Art

A customer at a clothing store may make a decision after trying on clothes that the customer selected. Accordingly, a customer would go through a process of trying several clothes on and comparing them before selecting the piece the customer will pay for.

However, a customer, in the process of comparing, would be in a trouble deciding which clothes fit better between the ones tried before and the ones they are wearing now every time the customer tries new clothes. In other words, it is inevitable that a customer will have trouble selecting because the customer forgets what part that the customer liked or did not like from the clothes tried before when trying new clothes on.

In this case, a customer makes a final decision after getting advice from a store assistant or trying the one tried before one more time. However, going through the process repeatedly is time consuming.

Therefore, to help a customer resolving such a problem, a clothing store brings in a device that captures a customer wearing clothes and shows the captured image afterwards, which allows the customer to make comparison between the one tried before and now.

Although such device shows an image of a customer wearing clothes, it is not possible for a customer to figure out what part of the clothes bothered the customer without trying the clothes on one more time.

SUMMARY

Exemplary embodiments address at least the above needs, and an aspect of the exemplary embodiments is to provide a display apparatus capable of providing information about an area of user's interest from a captured image and a controlling method thereof.

According to an aspect of an exemplary embodiment, there is provided a display apparatus including a display; an image capturer configured to capture an image of a user; a controller configured to analyze a user's movement in the captured image and to extract at least one area of interest in the captured image based on the analyzed movement; and a memory configured to store at least one area of interest from the captured image, wherein the controller is further configured to, in response to a predetermined event occurring, control the display to display the at least one area of interest.

The controller may be further configured to control the display to display the captured image and to display the area of interest identifiable from a remaining area in the captured image.

The controller may be further configured to control the display to enlarge the area of interest and display the enlarged area of interest in the captured image.

The controller may be further configured to analyze a movement of a user's eyes and extract an area from the captured image at which the user gazes for more than a predetermined time period as the area of interest.

The controller may be further configured to analyze a movement of a users' hand and extract an area from the captured image in which the user's hand is located for more than a predetermined time period as the area of interest.

The controller may be further configured to detect a body area of the user from the captured image and extract the area of interest from the detected body area.

The controller may be further configured to detect an object corresponding to a predetermined shape from the captured image and extract the area of interest from the detected objects.

The controller may be further configured to, in response to a predetermined event occurring, control the display to display at least one among an image of the area of interest, an explanatory text for the area of interest, and additional information regarding the area of interest.

The predetermined event may be an event where a user is recaptured, and wherein the controller may be further configured to, in response to the user being recaptured, control the display to display a recaptured image along with the stored at least one area of interest.

The display apparatus may further include an input interface configured to receive user information, wherein the controller may be further configured to match the area of interest with the received user information and store the matching information in the memory, and in response to an event to reenter the user information through the input interface occurring, recapture the user and display the recaptured image and the at least one stored area of interest.

According to an aspect of another exemplary embodiment, there is provided a method of controlling a display apparatus, the method including: generating a captured image of a user; analyzing a user's movement in the captured images, and extracting at least one area of interest in the captured image based on the analyzed user's movement; storing at least one extracted area of interest; and in response to a predetermined event occurring, displaying the at least one area of interest.

The displaying the area of interest may include displaying the captured image and distinguishing the area of interest from a remaining area in the captured image.

The displaying the area of interest may include enlarging the area of interest and displaying the enlarged area of interest in the captured image.

The method may include analyzing a movement of a user's eyes, wherein the extracting an area of interest may include extracting an area at which a user gazes more than a predetermined time period from the displayed captured image as the area of interest.

The extracting the area of interest may include analyzing a movement of a user's hand and extracting an area from the captured image in which the user's hand is located for more than predetermined time period as the area of interest.

The method may include detecting a body area of the user from the captured image, wherein the extracting the area of interest may include extracting the area of interest from the detected body area.

The method may include detecting an object corresponding to a predetermined shape from the captured image, wherein the extracting the area of interest may include extracting the area of interest from the detected object.

The displaying the area of interest may include, in response to the predetermined event occurring, displaying at least one among an image regarding to the area of interest, an explanatory text for the area of interest and additional information regarding the area of interest.

The predetermined event may be an event where a user is recaptured, wherein the displaying the area of interest may include, in response to the user being recaptured, displaying a recaptured image along with the at least one stored area of interest.

The method may include receiving user's information, wherein the storing may include storing the area of interest after matching the area of interest with the received user information, and the displaying the area of interest may include, in response to an event to reenter the user information occurring, recapturing the user and displaying the recaptured image and at least one stored area of interest.

BRIEF DESCRIPTION OF THE DRAWINGS

The above and/or other aspects will be more apparent by describing in detail exemplary embodiments, with reference to the accompanying drawings, in which.

DETAILED DESCRIPTION OF EXEMPLARY EMBODIMENTS

Figure 1:
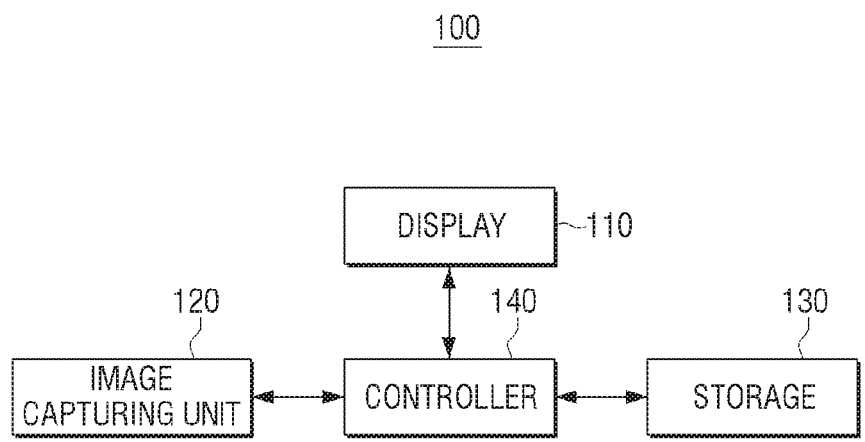
FIG. 1 is a block diagram illustrating the display apparatus according to an exemplary embodiment.

Exemplary embodiments are described in detail below with reference to the accompanying drawings.

In the following description, unless otherwise described, the same reference numerals are used for the same elements when they are depicted in different drawings. The matters defined in the description, such as detailed construction and elements, are provided to assist in a comprehensive understanding of the exemplary embodiments. Thus, it is understood that the exemplary embodiments can be carried out without those specifically defined matters. Also, functions or elements known in the related art may not be described in detail if they would obscure the exemplary embodiments with unnecessary detail.

The terms "first", "second", etc., may be used to describe diverse components, but the components should not be limited by the terms. The terms are only used to distinguish one component from the others, unless stated otherwise.

The terms used in the present disclosure are only used to describe the exemplary embodiments, and are not intended to limit the scope. The singular expression also includes the plural meaning as long as it does not differently mean in the context. In the present application, the terms "include" and "consist of" designate the presence of features, numbers, steps, operations, components, elements, or a combination thereof that are written in the specification, but do not exclude the presence or possibility of addition of one or more other features, numbers, steps, operations, components, elements, or a combination thereof.

According to an exemplary embodiment, a "module" or a "unit" performs at least one function or operation, and may be implemented in hardware, software, or a combination of hardware and software. In addition, a plurality of "modules" or a plurality of "units" may be integrated into at least one module except for a "module" or a "unit" which has to be implemented with specific hardware, and may be implemented with at least one processor.

FIG. 1 is a block diagram illustrating the display apparatus 100 according to an exemplary embodiment.

The display apparatus 100 may be embodied in various display devices such as a TV, smart phone, tablet PC, desktop PC, monitor, projector, and the like.

Meanwhile, the display apparatus 100 may be a Large Format Display (LFD) composed of a plurality of the display devices, but, for convenience of description, it is assumed that one display device is embodied in the following description.

Meanwhile, the display apparatus 100 may be a device providing a mirror display feature. The mirror display feature is a feature that an image capturing unit like a camera captures a subject in front and displays it in real-time, which provides an effect like a mirror.

Accordingly, the display apparatus 100 may apply to a clothing store to show a customer wearing clothes. A user makes decision which clothes to purchase after trying several clothes, and, if information about which part the user liked could be provided to the user, it may help make a purchase. The display apparatus 100, according to such request, aims at recapturing a user, analyzing a user movement from a captured image, and providing a feedback about an area in which the user was unconsciously interested.

According to FIG. 1, the display apparatus 100 includes a display 110, an image capturing unit 120 (e.g., image capturer), a storage 130 (e.g., memory), and a controller 140.

The display 110 is configured to display various screens according to the control of the controller 140.

The display 110, for example, may be embodied in Liquid Crystal Display (LCD), and may be embodied in cathode-ray Tube (CRT), plasma display panel (PDP), organic light emitting diodes (OLED), transparent OLED (TOLED), and the like. Further, the display 110 may be embodied in a form of a touch-screen that can detect a user by touch.

Specifically, the display 110 may display a captured image generated from the image capturing unit 120 in real-time.

The image capturing unit 120 is configured to capture a subject and generate a captured image. Here, the captured image is a concept that includes both a video and a stopped image.

The image capturing unit 120 may include a lens and an image sensor. Types of lens may include a general purpose lens, wide angle lens, zoom lens, and the like, and may be determined according to a type, feature, use environment, and the like, of the display apparatus 100. For the image sensor, a complementary metal oxide semiconductor (CMOS), a charge coupled device (CCD), and the like, may be used.

Specifically, the image capturing unit 120 is arranged in a way that it captures a front side of the display apparatus 100 so that may generate a captured image by capturing a user in front. The captured image may be displayed at the display 110 in real-time. Accordingly, the user may feel an effect of looking at a mirror as looking at the display apparatus 100.

The storage 130 is configured to store various programs and data that are necessary for the display apparatus 100 operation.

Specifically, at the storage 130, a captured image by each user is stored, and interest information by each captured image is stored. Further, at the storage 130, user information that is used to recognize a user is stored. The user information may include various information that are used to distinguish a user such as information about a user facial feature, ID, passwords, identification information of a user terminal device, and the like.

The controller 140 displays a stored captured image corresponding to a recognized user in the display 110, and, in this case, an area of interest may be displayed together.

The controller 140 is configured to control an overall operation of the display apparatus 100. Specifically, the controller 140 captures a user from the image capturing unit 120, analyzes a user movement from a generated captured image, and extracts at least one area in which the user is interested.

Specifically, the controller 140 analyzes a user movement from a captured image and extracts at least one area of interest which is determined to be the area in which the user is interested within the captured image based on the analyzed user movement.

According to an exemplary embodiment, the controller 140 may extract an area of interest based on a movement of user's hand. Specifically, since touching a specific part with user's hand often, means that the user is paying attention to the specific part, according to the example, the controller 140 may analyze the movement of the user's hand from a captured image and extract the area in which the user's hand is located for more than a predetermined time period as the area of interest.

Figure 2:
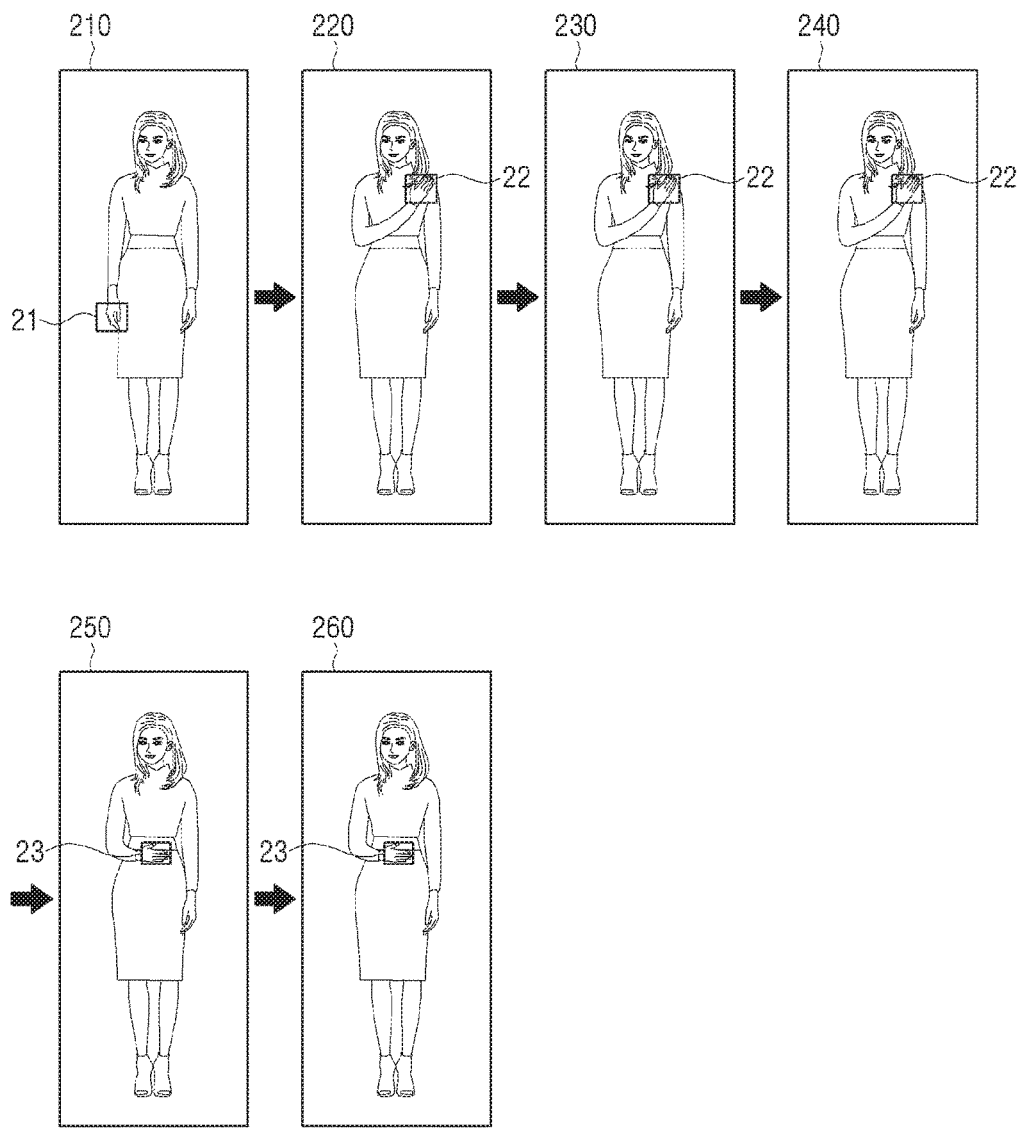
FIGS. 2 to 3B are views illustrating user movement analyzing methods in a captured image according to one or more exemplary embodiments.

FIG. 2 is a view illustrating user movement analyzing methods in a captured image according to one or more exemplary embodiments.

At FIG. 2, it is assumed that a captured image of a user captured by the image capturing unit 120 is a video comprised of 6 frames (210 to 260). The controller 140 may analyze the location of user's hand in each frame and extract an area of interest.

For example, a template for detecting a specific subject, in other words, user's hand is stored at the storage 130, and the controller 140 may use the template and detect the hand from the captured image. Specifically, the controller 140, at a frame constituting the captured image, may determine an area which matches with a stored template of user's hand as an area in which the user's hand is located. In addition to a template matching method, various extracting methods in the related art may be applied to exemplary embodiments.

The controller 140 may detect an area in which user's hand is located in each frame from the first frame 210 to the sixth frame 260 and analyze the movement in the captured image. The number of frames is proportional to the image playing time, and therefore, the controller 140, by comparing the area in which the user's hand is detected in each frame, may determine in which part the hand is located for more than a predetermined time period. Hereafter, it will be assumed that the number of a frame per second (FPS) is one, and an area in which the user's hand is located for more than 3 seconds is the area of interest in the following description.

According to FIG. 2, the controller 140 may determine whether areas in which the user's hand is detected in the second frame 220, the third frame 230 and the fourth frame 240 are the same, and whether areas in which the user's hand is detected in the fifth frame 250 and the sixth frame 260 are the same. Further, the controller 140 may determine whether the area 21 in which the user's hand is detected from the first frame 210 is different from the other area in which the user's hand is detected in other frames.

Based on the analysis results above, the controller 140 may determine the user's hand located in the area 22 for more than 3 seconds and extract the area 22 as the area of interest.

In this case, the controller 140 may consider not only a case of user's hand being located in the same area in the continuous frames but also a case of user's hand being located in the same area in the discontinuous frames and may extract the area of interest. In other words, in case in which user's hand is located at a sleeve area in the first and second frame, and the hand is located at a head area in the third frame, and then, the hand is located back at the sleeve area in the fourth frame, then, the controller 140 may determine the hand is located at the sleeve area for more than 3 seconds and may extract the sleeve area as the area of interest.

On the other hand, the above discloses that the area of interest is extracted only when it satisfies user's hand being located for more than predetermined time period, but according to another example, the area of interest may be extracted based on the relative time period for which the user's hand is located in each frame.

For further detail, the controller 140 may extract an area in which the user's hand is located for the longest period of time from a captured image as the area of interest. Otherwise, it may determine a ranking from an area in which the user's hand is located for the longest period of time to an area in which the user's hand is located for the shortest period of time, and may extract areas which lie above a specific rank as the area of interest.

On the other hand, to determine exactly in which area the user's hand is located, according to another exemplary embodiment, the image capturing unit 120 may be embodied in a 3D camera capable of estimating a three-dimension location of a subject from a captured image or embodied in two cameras to estimate a three-dimension location of a subject by using a stereo image method.

Accordingly, once the three-dimension location of the user's hand is identified, it becomes possible to determine whether the user's hand is located in the air or clothes, so that it may extract the area of interest from clothes more precisely.

In the description above, exemplary embodiments of extracting the area of interest based on the user's hand movement are described in detail. Below, exemplary embodiments of extracting an area of interest based on a user's eye movement.

Figure 3A:
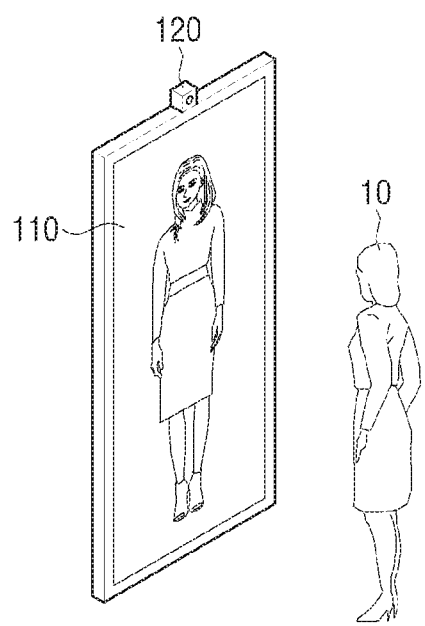
Figure 3B:
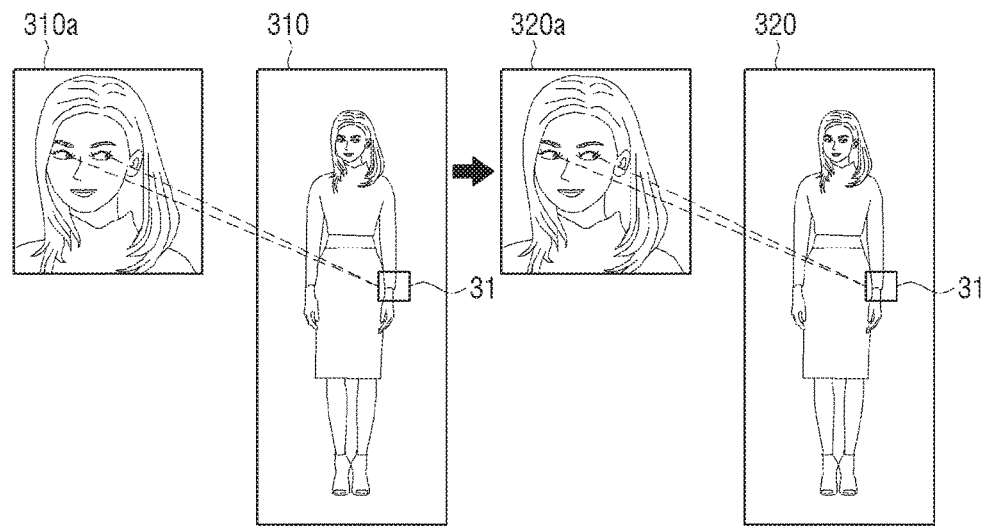
Figure 3B:
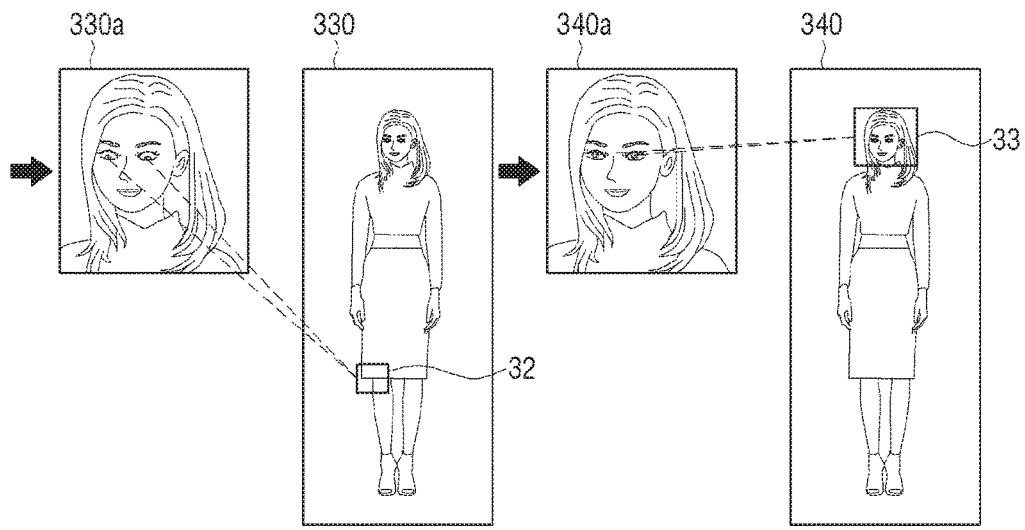

FIG. 3A to FIG. 3B are views illustrating an extraction of an area of interest based on the user movement analysis in a captured image according to another exemplary embodiment.

Referring to FIG. 3A, the captured image capturing the user 10 through the image capturing unit 120 is displayed through the display 110 in real-time. The user 10 would gaze at an area of interest in the user image displayed through the display 110 for a long period of time, and therefore, the area of interest may be extracted based on the user's eye movement.

Specifically, the controller 140 may detect a user's gazing point from an image if the user 10 is captured through the image capturing unit 120 and may determine in which area of the image displayed through the display 110 (in other words, the user image) the detected gazing point is located. Further, the controller 140 may extract an area in which the user gazes for more than a predetermined time period from an image displayed at the display 110 as the area of interest.

The controller 140 may detect the user's gazing point with various algorithms. For example, the image capturing unit 120 may be a device comprising a light emitting area configured to irradiate infrared light and may irradiate the infrared light to a user's eye when capturing. In the captured image, the infrared light that is reflected from user's cornea may appear, and the controller 140, by using a location of the reflected infrared light, may detect a pupil by distinguishing the pupil from an iris, and therefore, obtain user's gazing point information.

For another example, the controller 140 may detect the location of a user's eyes with a method finding a feature of a subject (for example, Haar-like features), detect the iris and pupil from the location of the use's eyes with an edge detection method, and detect a user's gazing point based on the relative location of the iris and pupil.

For another example, the controller 140 may extract a feature of a user's face from a captured image, determine a head posture based on the feature of the user's face, and detect a user's gazing point.

For another example, to collect user's gazing point information, the display apparatus 100 may be connected to a wearable device such as smart glasses. The smart glasses may capture a user's eye and transmit the captured image to the display apparatus 100. The controller 140 may detect a user's gazing point from the captured image transmitted from the smart glasses.

Various methods in the related art may be applied to the exemplary embodiments to detect a user's gazing point and may not be described in detail.

Further, the controller 140, to determine at which part of an image displayed in the display 110 a user gazes, may project the user's gazing point onto the captured image. Specifically, data regarding the correlation between a location of the image capturing unit 120 and an image displayed in the display 110 is stored at the storage 130, and by using this data, the controller 140, by converting the coordinate of the user's gazing point detected from an captured image based on the image displayed in the display 110, may detect the area at which the user gazes from the captured image displayed in the display 110.

According to one or more exemplary embodiments, an image capturing a user through the image capturing unit 120 as shown in the FIG. 3B is a video comprised of 4 frames (310 to 340)

For better understanding, the first frame 310 to the fourth frame 340 illustrating a captured image are shown on the right side of the FIG. 3B, the user's face areas of each of the first frame 310 to the fourth frame 340 (310a to 340a) are shown on the left side, and the user's gazing points from each frame are shown.

The controller 140 may detect user's gazing point from each of the first frame 310 to the fourth frame 340 comprising of the captured image. The number of frames is proportional to the image playing time so that the controller 140, by comparing an area at which the user gazes in each frame, may determine at which area the user gazes for more than a predetermined time period.

It will be assumed that the number of a frame per second (FPS) is one, and an area at which the user gazes for more than 2 seconds is an area of interest in the following description.

According to FIG. 3B, the controller 140 may determine whether the areas 31 at which the user gazes in the first frame 310 and the second frame 320 are the same, determine whether an area 32 at which the user gazes in the third frame 330 is different from the other areas at which the user gazes in other frames, and determine whether an area 33 at which the user gazes in the fourth frame 340 is different from the other areas at which the user gazes in other frames.

Based on the analysis results above, the controller 140 may determine that the user gazes the area 31 for more than 2 seconds and extract the area 31 as the area of interest.

In this case, the controller 140 may consider not only a case of a user gazing at the same area from the continuous frames but also a case of a user gazing at the same area from the discontinuous frames and may extract the area of interest. In other words, if a user gazed at a sleeve area in the first frame, gazed at a face area in the second frame, and then, gazing back at the sleeve area in the third frame, then, the controller 140 may determine that the user gazed at the sleeve area for more than 2 seconds and may extract the sleeve area as the area of interest.

On the other hand, the above discloses that the area of interest is extracted only when it satisfies a user gazing for more than predetermined time period, but according to another example, the area of interest may be extracted based on the relative time period for which the user gazes in each frame.

For further detail, the controller 140 may extract an area at which the user gazes for relatively longer period of time in a captured image as the area of interest. Otherwise, it may determine a ranking from an area at which the user gazes for the longest period of time to an area at which the user gazes for the shortest period of time and may extract areas that lie above a specific rank as the area of interest.

According to another exemplary embodiment, to avoid an error that an area of interest is extracted outside the user's body area, the controller 140 may detect the user's body area within the captured image and extract the area of interest from the detected body area.

For example, the controller 140, first, may extract the area of interest based on the analysis of a location of either user's hand or user's gazing point. Further, among the extracted areas of interest, only areas of interest within the user's body area may be determined as the area of interest. According to one or more exemplary embodiments, although a user gazes an area other than oneself for more than the predetermined area, the controller 140 does not extract it as the area of interest.

In this case, within the area of user's body, to avoid an error that the area of interest is extracted from an area in which clothes is not located, the controller 140 may detect an area in which clothes is located and extract the area of interest only within the clothes area.

For example, as shown in the first frame 210 of the FIG. 2, in case in which the user stands up straight for more than predetermined time period, according to one or more exemplary embodiments, since the user's hand is located in an area that is not a clothes area, the area in which the hand is located would not be extracted as the area of interest.

Likewise, for example, like the fourth frames 340 of the FIG. 3B, in case in which the user gazes its face for more than predetermined time period, according to one or more exemplary embodiments, since the area at which the user gazes is not the clothes area, the face area would not be extracted as the area of interest.

According to the preceding examples, there is an advantage that only the area in which the user was interested about the clothes may be extracted as the area of interest.

According to one or more exemplary embodiments, the controller 140 may consider a location of both the user's hand and gazing point and extract the area of interest. The area in which both the user's hand and gazing point are located may be considered as the area in which the user is particularly interested.

Specifically, the controller 140, as described above, extracts a number of reserved areas of interest based on the user's hand movement and extracts a number of reserved areas of interest based on the user's gazing point. Further, the final area of interest may be determined among those coincided with each other between the reserved area of interest based on the movement of user's hand and user's gazing point.

On the other hand, the area of interest which was extracted based on the consideration of both a user's hand and a user's gazing point may be classified as the special area of interest and may be treated differently from the ordinary area of interest which was extracted based on the consideration of each user's hand and user's gazing point. For example, for the foregoing method of displaying the area of interest, the special area of interest may be displayed differently from the ordinary area of interest.

According to one or more exemplary embodiments, the controller 140 may extract the area of interest from the captured image in advance and may determine the area of interest among reserved areas of interest based on the user movement analysis as described above.

Figure 4:
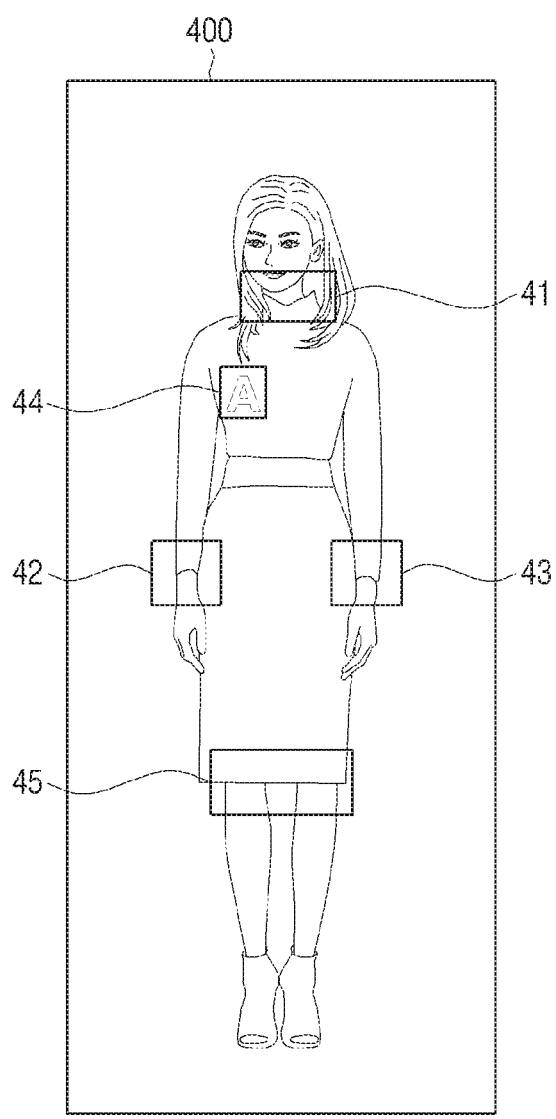
FIG. 4 is a view illustrating detecting a subject in a captured image according to an exemplary embodiment.

Referring to the FIG. 4, the controller 140, from the captured image 400, may detect subjects (41, 42, 43, 44, and 45) corresponding to a predetermined shape, analyze the user movement, and extract the area of interest from the detected subjects.

Here, the subject corresponding to the predetermined shape includes a subject corresponding to a shape of a collar, a sleeve, a hem of skirt, a trouser cuff, mark, and the like, which generally attracts user's interest from clothes.

Specifically, a template for detecting a predetermined shape is stored at the storage 130, and the controller 140 may detect subjects (41, 42, 43, 44, and 45) which match with the stored template. In this case, the mark 44 may be detected through a color comparison with the background color.

The controller 140, among detected subjects, may extract the area of interest based on the movement of user's hand and gazing point as described above.

According to one or more exemplary embodiments, if a subject corresponding to a sleeve shape is extracted as an area of interest, the information about the sleeve may be provided. In other words, since it becomes possible to identify which subject is corresponded to an extracted area of interest, various information about the area of interest may be provided. This will be described in detail with FIG. 6.

The area of interest which is extracted according to one or more exemplary embodiments described above may be matched with the user information and stored at the storage 140. The user information may include various information that may be used to recognize a user such as user's facial feature, ID, passwords, and identification information of user's terminal device, and the like.

When a predetermined even occurs, the display 110 may be controlled to display the stored area of interest.

The predetermined even may be an event in which a user existing in a captured image with an extracted area of interest is re-recognized.

There are various methods of recognizing a user. For example, the methods may include entering ID or passwords by a user, recognizing an ID card, recognizing a user through communicating with user's terminal device like a smart phone, and recognizing a user with user's bio-information.

According to an exemplary embodiment, the display apparatus 100 may recognize a user by recognizing the user's face in an image captured through the image capturing unit 120.

Specifically, the controller 140 may detect user's face in an image captured with the image capturing unit 120 and extract facial features of eyes, a glabella, a nose, nostrils, lips, and face contour. Likewise, based on the extracted facial features in the captured image, the controller 140 generates user information.

The controller 140 may match user information which is generated based on the facial features extracted from a captured image with the area of interest which is extracted from the captured image and may store the information in the storage 130.

Then, the controller 140, in response to an event in which a user identical to the user having an area of interest stored in the storage 130 is recaptured occurring, may control the display 110 to display the area of interest. Specifically, the controller 140 may extract a facial feature from the recaptured image and generate user information, and if the generated user information matches with the user information stored in the storage 130, may control the display 110 to display the interest information which was stored after being matched with the user information.

Thus, when a user stands in front of the display apparatus 100, a facial recognition is performed automatically, and therefore, the area in which the user was interested from the clothes that the user tried in the past may be displayed in the display 110.

According to another exemplary embodiment, the display apparatus 100 may further include an input unit (e.g., input interface). Through the input unit, a user may input personal identifiable information such as ID, passwords, and the like. Otherwise, the input unit of the display apparatus may be equipped with a wireless communication module like NFC, Bluetooth, and the like, and recognize a user through a wireless communication with a user's terminal device.

In this case, the controller 140 may match the area of interest extracted from a captured image with the user information received from the input unit and store the information at the storage 130, and in response to an event in which user information is re-received trough the input unit such as entering ID, NFC tagging, or a similar kind, occurring, may control the display 110 to display the area of interest which was matched with the user information.

In this case, when user information is re-received through the input unit, the controller 140 may operate the image capturing unit 120 to generate a captured image and may control the display 110 to display the generate captured image along with the interest information.

According to one or more exemplary embodiments, an area of interest may be provided to user in various ways.

Figure 5:
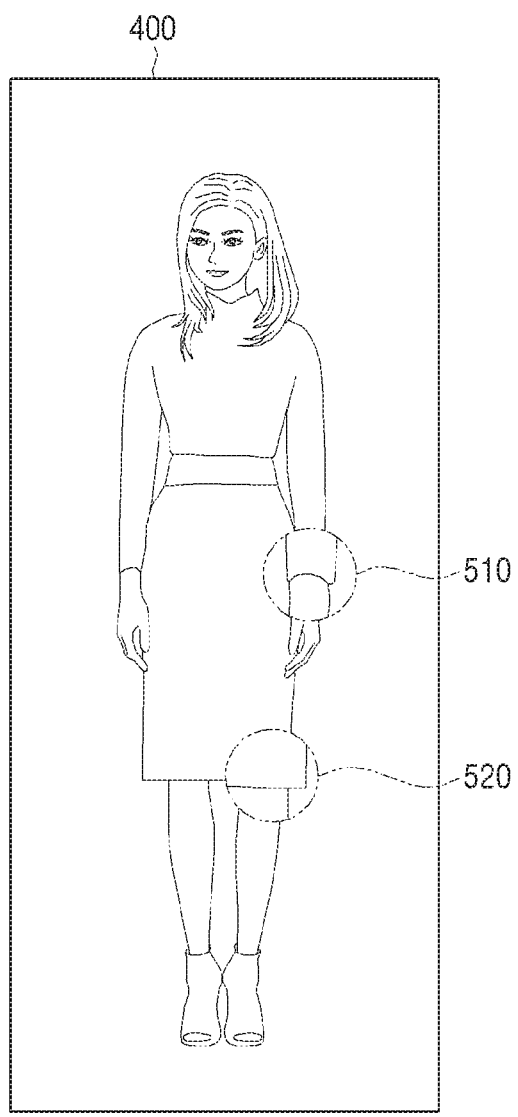
FIGS. 5 to 7 are views illustrating methods of providing an area of interest of the display apparatus according to one or more exemplary embodiments.

According to an exemplary embodiment, the controller 140, while displaying a captured image from which an area of interest was extracted, may display the area of interest distinctively from the rest of the areas. FIG. 5 is a view illustrating methods of providing an area of interest of the display apparatus according to an exemplary embodiment.

It is assumed that areas of interest extracted based on a user's hand or eyes movements are a sleeve area and a trouser cuff area. Referring to the FIG. 5, the controller 140, in response to the event in which a user is re-recognized as described above occurring, may control the display 110 to enlarge and display the sleeve area 510 and trouser cuff area 520 in the captured image 500 and display rest of areas at a normal magnification while displaying the captured image 500.

According to another exemplary embodiment, the controller 140 may display a graphic object pointing an area of interest in a captured image. For example, by displaying a graphic object that can draw an attention of a user such as an arrow, an asterisk, and the like, it can distinguish the area of interest from the rest of the areas.

Figure 6:
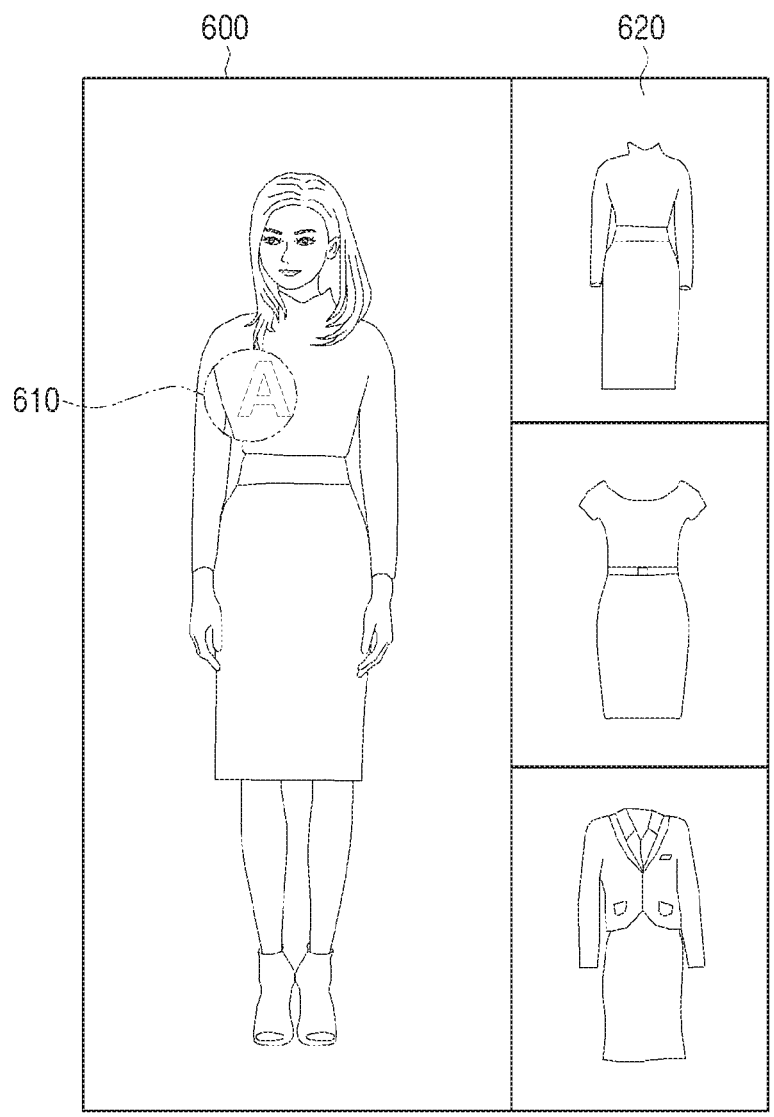

FIG. 6 is a view illustrating a method of providing an area of interest according to another exemplary embodiment.

It is assumed that the area of interest extracted based on a movement of user's hand or user's gazing point is a mark area in clothes. Referring to FIG. 6, the controller 140, in response to an event in which a user is re-recognized occurring, may enlarge and display the mark area 610, which is the area of interest, and may display the additional information 620 related to the area of interest.

For example, the additional information 620 may be a recommendation of other product related to the area of interest. The facts that the user was interested in the mark in the clothes tried in the past and that it was re-recognized by the display apparatus 100 suggest that a user appeared with new clothes on because the user did not like the clothes with the mark attached. Accordingly, in this case, as shown in the FIG. 6, clothes without a mark may be included as a recommendation.

Thus, other than displaying additional information about the area of interest, according to one or more exemplary embodiments, the controller 140 may display a variety of information such as a text explaining an area of interest, and the like, along with the area of interest.

Figure 7:
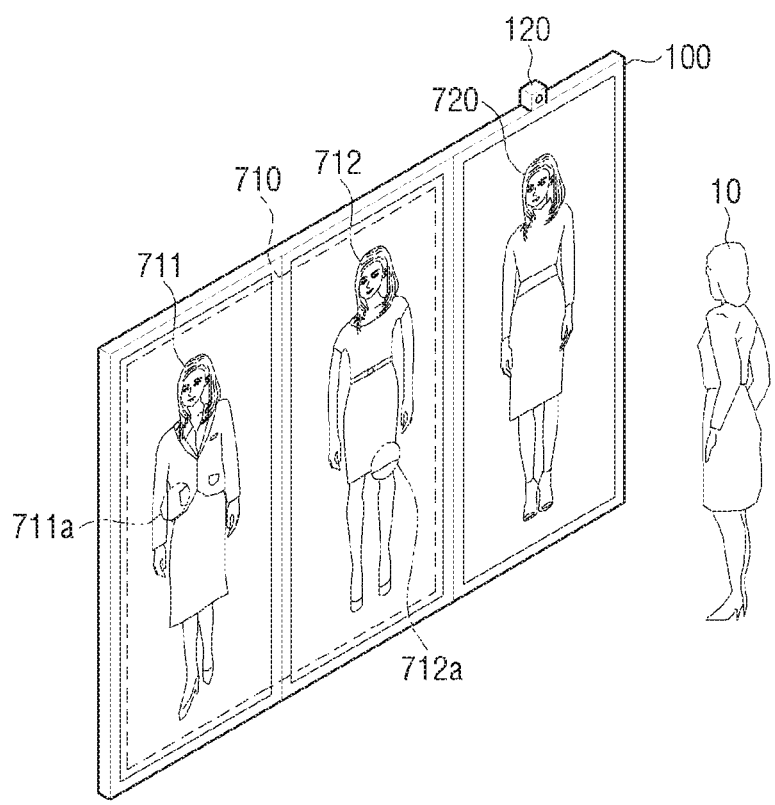

FIG. 7 is a view illustrating a method of providing an area of interest of the display apparatus according to one or more exemplary embodiments.

In response to an event the user 10 is re-recognized occurring, the controller 140 may control the display 110 to display the figure of the user being captured at present along with a stored area of interest related to the user 10.

Specifically, as shown in the FIG. 7, the controller 140 may display both a screen of an area of interest 710 and a present capturing screen 720.

At the screen of the area of interest 710, the captured image capturing the user 10 and the area of interest included therein are displayed, and at the present capturing screen 720, an image being captured by the image capturing unit 120 is displayed in real-time.

In this case, the screen of the area of interest 710 may be displayed together with a plurality of captured images that were captured beforehand. For example, the captured image may be displayed in chronological order. In other words, among the captured images taken in the past, the latest captured image is displayed in the screen 712, and the image captured beforehand may be displayed in the screen 711. Further, at each captured image, an area of interest which is extracted from the each captured image may be displayed. As show in the FIG. 7, the area of interest 711A which is extracted from the 711 screen is displayed, and the area of interest 712A which is extracted from the screen 712 is displayed.

On the other hand, the display apparatus 100 may display the entire user images stored in the past or may display only a specific image. According to an exemplary embodiment, the display apparatus 100 may display a list of stored images in a user's account and include an input unit to receive a user command, and the controller 140, according to a user command received, may display the selected image.

According to one or more exemplary embodiments, a user may select a desired body posture from a captured image and play. Further, the user may select a plurality of body posture, and the controller 140 may display at the display 110 an image corresponding to the selected body posture.

According to an exemplary embodiment, the display apparatus 100 may allow the user to compare the clothes which the user is currently wearing with the clothes which the user tried in the past and may remind of the area of interest from the clothes tried in the past. Accordingly, the user may become aware of in which part the user was interested from the clothes tried in the past and may get help pick clothes.

Figure 8:
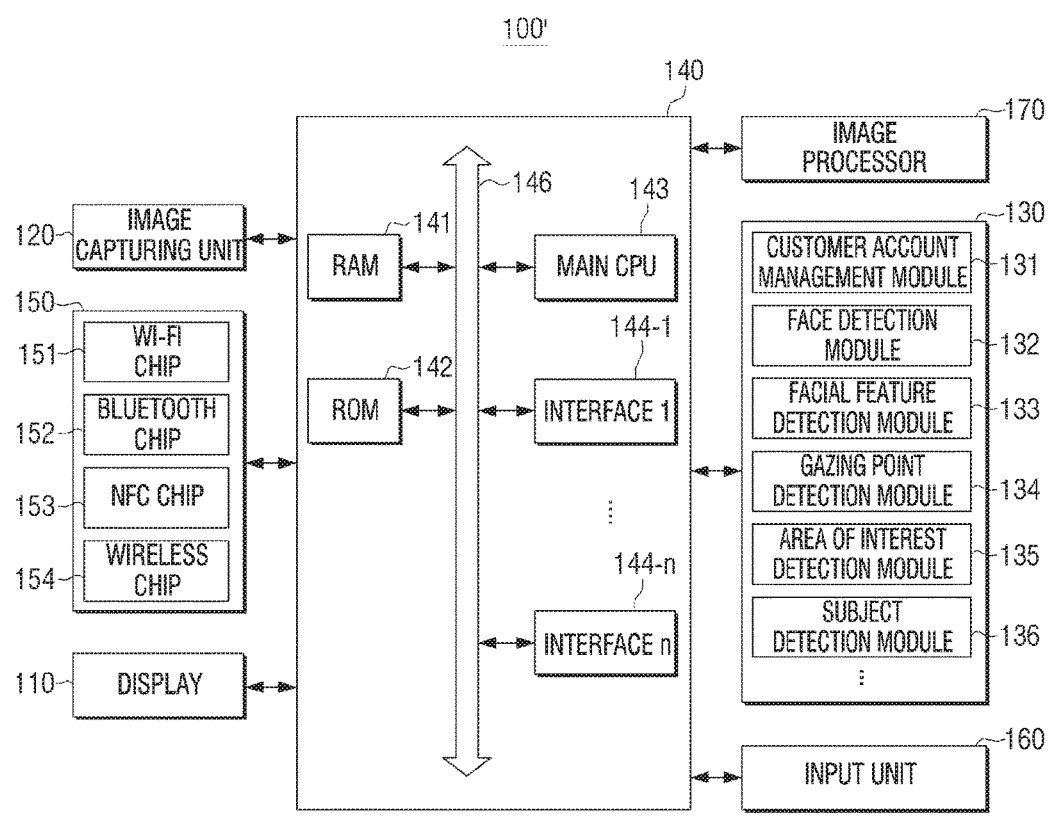
FIG. 8 is a block diagram illustrating the display apparatus according to one or more exemplary embodiments.

FIG. 8 is a block diagram illustrating the display apparatus 100' according to one or more exemplary embodiments.

According to FIG. 8, the display apparatus 100' includes a display 110, an image capturing unit 120, a communicator 150, a storage 140, an input unit 160, and an image processor 170.

The display 110 is configured to display various graphic objects according to the control of the controller 140. The display 110 may be embodied in Liquid Crystal Display (LCD), and as circumstances require, may also be embodied in cathode-ray tube (CRT), plasma display panel (PDP), organic light emitting diodes (OLED), and the like. Further, the display 110 may be embodied in a form of a touch screen that can detect user's touch operation.

The captured image 120 is configured to generate a captured image by capturing a subject. However, such captured image 120 may not be embedded in the display apparatus 100' but may be connected to the display apparatus 100' via a wire or wireless network.

The communicator 150 is configured to communicate with various types of external devices according to various types of communication methods.

The display apparatus 100' may be embodied in a device in which a capturing device is embedded, and therefore, connected to an external capturing device. In this case, the communicator 150 may receive a captured image from the external device. Further, the communicator 150 may communicate with a user terminal device and receive required user information to recognize a user from the user terminal device.

The communicator 150 includes various communication chips such as Wi-Fi chip 151, Bluetooth chip 152, NFC chip 153, wireless chip 154, and the like. The Wi-Fi chip 151, Bluetooth chip 152, NFC chip 153, and wireless chip 154 communicate via Wi-Fi, Bluetooth, and NFC respectively. Among others, the NFC chip 153 means a chip that operates with Near Field Communication (NFC) method which uses 13.65 MHz among various RH-ID frequencies such as 135 kHz, 13.56 MHz, 433 MHz, 860-90 MHz, 2.45 GHz, and the like.

In case of using the Wi-Fi chip 151 or Bluetooth chip 152, by transmitting and receiving various information such as SSID and a session key, and the like, the communicator 150 may transmit or receive the various information after communication connection. The wireless chip 154 means a chip that operates according to various communication standards such as IEEE, ZigBee, $3^{rd}$ Generation (3G), $3^{rd}$ Generation Partnership Project (3GPP), Long Term Evolution (LTE), and the like.

The controller 140 may display an image received from an external device through the communicator 150 in the display 110.

The input unit 160 is configured to receive user input to control the display device 100'. Especially, the input unit 160 may receive information required to recognize a user such as ID, passwords, and the like.

For example, the input unit 160 may be embodied in various input devices such as a keyboard, a pointing device, a motion sensor that detects user's motion, a voice sensor that detects user's voice, a mouse, and the like.

The image processor 170 is configured to process an image received from an external device or an image stored and configured in the past. For example, it may perform signal processing such as video decoding, format analysis, video scaling, and the like, and adding GUI, and the like.

Specifically, the image processor 170 may receive a captured image from an external capturing device, and, to avoid personal information leakage, may code the captured image and store at the storage 130. Further, it may decode the stored coded image.

The image processor 170, to avoid exposing a user's face in public, may pixelate a facial area.

Further, the image processor 170, according to a user command received through the input unit 160, may play a stored captured image and perform an image processing such as play, rewind, fast forward, pause, image segmentation, body posture selection, on/off pixilation of a face, and the like.

At the storage 130, a program such as various applications is stored. Specifically, at the storage 130, a customer account management module 131, a face detection module 132, a facial feature detection module 133, a gazing point detection module 134, and a subject detection module 136 may be stored.

Specifically, at the storage 130, a captured image and an area of interest by each customer area matched and stored.

The controller 140 controls the display apparatus 100' by using various programs stored in the storage 130.

The controller 140 may include RAM 141, ROM 142, a main CPU 143, interface 1 to n 144-1 to 144-$n$, and a bus 146. The RAM 141, the ROM 142, the main CPU 143, the interface 1 to n 144-1 to 144-$n$ may be connected to each other through the bus 146.

The interface 1 to n 144-1 to 144-$n$ may be connected to the foregoing various components. One of interfaces may be a network interface that is connected to an external device through a network.

The main CPU 143 accesses to the storage 130 and performs booting by using a stored o/s. Further, it performs various operations by using various programs, contents, data, and the like.

The ROM 142 stores a set of commands, and the like, for system booting. When power is supplied after a turn-on command is received, the main CPU 143 copies O/S which was stored at the storage 130 onto the RAM 141 according to a stored command, operates the O/S, and re-boots the system. When the booting is completed, the main CPU 143 copies various stored application programs onto the RAM 141 and performs the various operations by operating an application program which was copied onto the RAM 141.

The main CPU 143, when various types of user operations are detected through the input unit 160, determines whether an event which matches with an event information stored at the storage 130 occurs by using the detection result. The event may be configured in a various ways. For example, it may include an event in which a user is recognized, an event in which a user touches or selects a button, an event in which a motion gesture, a voice command, or a similar kind, is received, an event in which a command to operate an application is received, an event in which a command to play a content is received, an event in which a predetermined time or cycle is elapsed, an even in which a system alarm message is generated, an event in which a communication with an external sources is performed, and the like.

The controller 140 may detect a face in a captured image acquired from an external capturing device by using the face detection module 132 stored at the storage 130 and may correspond information about the number of detected faces, size (based on pixel), location (an image coordinate X, Y) to the captured image.

Further, the controller 140, by using the facial feature detection module 133 stored at the storage 130, may extract a facial feature based on the face location information acquired through the face detection module. The extracted feature has X, Y coordinate and is a feature of eyes, a glabella, a nose, nostrils, lips, and face contour.

The controller 140, by using the gazing point detection module 134, extracts user's gazing point and head posture information based on an interpretation of a relationship among coordinates acquired through the facial feature detection module 133. Further, through a captured image standard and a conversion of a coordinate of a point which a user gazes through the display 110, the area at which the user gazes through the display 110 may be detected.

Further, the controller 140, by using the subject detection module 136, extracts a subject having a predetermined shape in a captured image. For example, the predetermined shape may include a subject with shape like a hand, a collar, a sleeve, a trouser cuff, a hem of skirt, and the like, and the controller 140, based on the predetermined shape, may detect a subject corresponding to a hand, a collar, a sleeve, a trouser cuff, a hem of skirt, and the like.

Further, the controller 140, by using the subject detection module 136, may detect user's body area in a captured image, identify a posture from the body area, and synchronize the posture information (front, back, and side) with the captured image.

The controller 140, by using the area of interest detection module 135, may extract an area of interest from the captured image based on the information acquired through the gazing point detection module 134 or the subject detection module 136.

The controller 140 recognizes a face in a captured image, creates a customer account by using the customer account management module 131 in case in which a user is recognized for the first time, and stores the captured image and an extracted area of interest in the created customer account.

Further, the controller 140 may generate comprehensive information DB by classifying each customer through a facial recognition. The controller 140, in response to a user not being recognized for the first time, in other words, a user being re-recognized, may display a captured image which was stored in the user's account and an area of interest included in the captured image.

According to one or more exemplary embodiments, the display apparatus 100' may further include a USB port that is connectable to a USB connector, a head set, a mouse, various external input ports to connect to an external terminal such as LAN, and the like, a Digital Multimedia Broadcasting (DMB) chip that receives and process DMB, various sensors, and the like, may be embedded with an image capturing unit instead of receiving a captured image from an external capturing device, and may include other features such as a speaker, a microphone, and the like.

One or more exemplary embodiments may be embodied in a computer or a readable media similar to the computer by using software, hardware, or a combination thereof. According to an exemplary embodiment with the hardware, the exemplary embodiments described herein may be embodied in at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for other functional operations. In some cases, an exemplary embodiment may be embodied in the controller 140. According to an exemplary embodiment with the software, one or more exemplary embodiment such as procedures and functions described herein may be embodied in separate software modules. Each of the software modules may perform more than one function and operation described herein.

Figure 9:
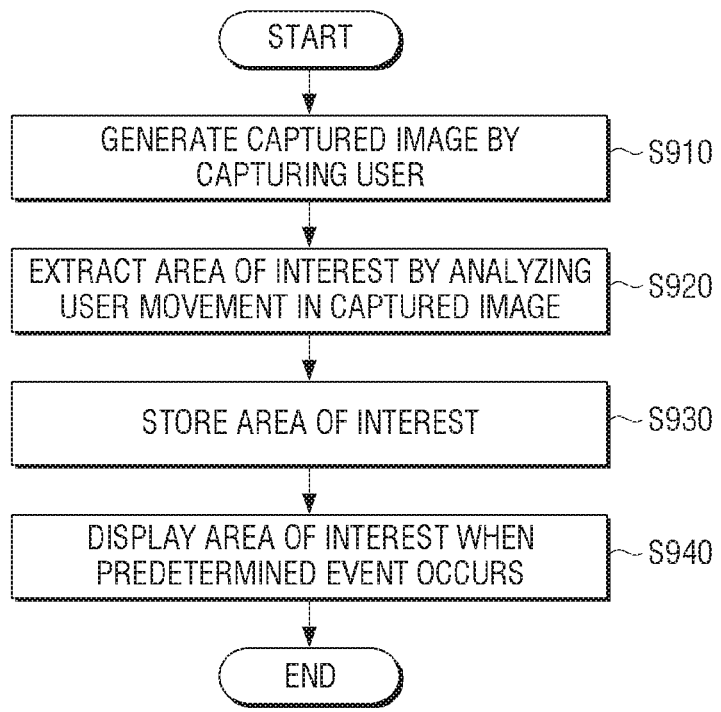
FIG. 9 is a flowchart illustrating controlling methods of the display apparatus according to one or more exemplary embodiments.

FIG. 9 is a flowchart illustrating controlling methods of the display apparatus according to one or more exemplary embodiments.

Referring to the FIG. 9, first, the display apparatus generates a captured image S910 by capturing a user. In this case, a facial recognition of a user may be performed in the captured image. If a face is recognized for the first time, it registers as a new user.

Then, the display apparatus analyzes a user movement in the captured image and extracts at least one area in which the user is interested from the captured image based on the user movement analysis S920. Here the user movement may be at least one of user's hand movement and user's eye movement.

Then, the display apparatus stores at least one area of interest S930. In this case, the extracted area of interest is matched with the recognized user information from the captured image and stored.

Then, the display apparatus 100, in response to a predetermined event occurring, displays at least one stored area of interest S940. The predetermined event is an event in which a user is re-recognized, specifically, an event in which user's face is re-recognized.

For example, an area of interest may be displayed with the captured image from which the area of interest was extracted. In this case, the area of interest may be displayed distinctively from the other area in the captured image. For example, the area of interest may be enlarged and displayed. On the other hand, the area of interest may be displayed in a stopped image or video.

Further, an area of interest and additional information may be displayed additionally, and various objects related to the area of interest such as a text, an image, and the like may be displayed together. The additional information may include a recommendation for other product, and the recommendation may include a product display location, a price, an inventory, a color, a size, a manufacturer, and the like.

Meanwhile, in this case, an image capturing a user at present may be displayed together, at the same time, with a captured image including an area of interest, in other words, an image captured in the past. In other words, since an image captured in the past is displayed along with a user's present image, and the image captured in the past includes an indication for an area of interest, the user may be able to compare clothes wearing at present with clothes tried in the past and further be able to know in which part of the clothes tried in the past the user was interested.

Exemplary embodiments of the controlling method of the display apparatus may be obtained by adding operations performed in exemplary embodiments illustrated in FIGS. 1 to 8 to the stages described in FIG. 9.

According to the above exemplary embodiments, the controlling method of the display apparatus may be embodied in a program which includes a feasible algorithm applicable in a computer, and the program may be stored at a non-transitory computer readable medium for use. The non-transitory computer readable medium may be installed in various devices for use.

The non-transitory computer readable medium may refer to a readable medium from a device that stores data semi-permanently, not a medium that stores data for short period of time such as register, cash, memory, and the like. Specifically, the program to perform various methods stated above may be stored in the non-transitory computer readable medium such as CD, DVD, hard disk, blue-ray disk, USB, memory card, ROM, and the like, for use.

Accordingly, the program may be installed in a display apparatus, such as a TV, smart phone, tablet PC, desktop PC, monitor, projector, and the program enables the display apparatus to display the area in which a user is interested.

Although one or more exemplary embodiments are described and illustrated herein, exemplary embodiments are not to be construed as limited to the above exemplary embodiments. Without departing from the principles and spirit of the scope of which is defined in the appended claims, many alternatives and variations will be apparent to those skilled in the art.

What is claimed is:

1. A display apparatus comprising:
    a display;
    a memory;
    a camera; and
    a controller configured to:
        analyze a movement of a user in a first image captured by the camera, and obtain at least one area of interest in the first image based on the analyzed movement,
        control the memory to store the first image and at least one area of interest obtained from the first image,
    wherein the controller is further configured to,
        based on a second image of the user being captured by the camera, control the display to display the second image along with the first image in which an enlarged at least one area of interest is displayed, and display the enlarged at least one area of interest in the first image together with additional information related to the at least one area of interest.

2. The display apparatus as claimed in claim 1, wherein the controller is further configured to analyze a movement of eyes of the user and obtain an area from the first image at which the user gazes for more than a predetermined time period as the at least one area of interest.

3. The display apparatus as claimed in claim 1, wherein the controller is further configured to analyze a movement of a hand of the user and obtain, as the at least one area of interest, an area from the first image in which the hand of the user is located for more than a predetermined time period.

4. The display apparatus as claimed in claim 1, wherein the controller is further configured to identify a body area of the user from the first image and obtain the at least one area of interest from the identified body area.

5. The display apparatus as claimed in claim 1, wherein the controller is further configured to identify an object corresponding to a predetermined shape from the first image and obtain the at least one area of interest from the identified objects.

6. The display apparatus as claimed in claim 1, wherein the controller is further configured to, based on a predetermined event occurring, control the display to display at least one among an image of the at least one area of interest, an explanatory text for the at least one area of interest, and additional information regarding the at least one area of interest.

7. The display apparatus as claimed in claim 1, further comprising:
an input interface configured to receive user information,
wherein the controller is further configured to match the at least one area of interest with the received user information and store information about the match in the memory, and based on an event to reenter the user information through the input interface occurring, recapture the user and display the second image and the at least one area of interest.

8. A method of controlling a display apparatus, the method comprising:
obtaining a captured first image of a user;
analyzing a movement of the user in the first image, and obtaining at least one area of interest in the first image based on the analyzed movement;
storing the first image and at least one area of interest obtained from the first image; and
based on a second image of the user being captured, displaying the second image along with the first image in which an enlarged at least one area of interest is displayed, and displaying the enlarged at least one area of interest in the first image together with additional information related to the at least one area of interest.

9. The method as claimed in claim 8, further comprising:
analyzing a movement of eyes of the user,
wherein the obtaining the at least one area of interest comprises obtaining an area at which a user gazes more than a predetermined time period from the first image as the at least one area of interest.

10. The method as claimed in claim 8, wherein obtaining the area of interest comprises analyzing a movement of a hand of the user and obtaining, as the at least one area of interest, an area from the first image in which the hand of the user is located for more than predetermined time period.

11. The method as claimed in claim 8, further comprising:
identifying a body area of the user from the first image,
wherein the obtaining the at least one area of interest comprises obtaining the at least one area of interest from the identified body area.

12. The method as claimed in claim 8, further comprising:
identifying an object corresponding to a predetermined shape from the first image,
wherein the obtaining the at least one area of interest comprises obtaining the at least one area of interest from the identified object.

13. The method as claimed in claim 8, wherein the displaying the at least one area of interest comprises, based on a predetermined event occurring, displaying at least one among an image regarding to the at least one area of interest, an explanatory text for the at least one area of interest and additional information regarding the at least one area of interest.

14. The method as claimed in claim 8, further comprising:
receiving user information,
wherein the storing comprises storing the at least one area of interest after matching the at least one area of interest with the received user information, and the displaying the at least one area of interest comprises, based on an event to reenter the user information occurring, recapturing the user and displaying the second image and the stored at least one area of interest.

\* \* \* \* \*